United States Patent [19]

Culbertson et al.

[11] 4,279,833
[45] Jul. 21, 1981

[54] ACRYLIC MONOMERS CONTAINING CARBAMATE FUNCTIONALITY

[75] Inventors: Billy M. Culbertson, Worthington; Larry K. Post, Columbus, both of Ohio

[73] Assignee: Ashland Chemical Company, Columbus, Ohio

[21] Appl. No.: 103,971

[22] Filed: Dec. 17, 1979

[51] Int. Cl.$^3$ ............... C07C 125/065; C07C 125/073
[52] U.S. Cl. ............................. 260/464; 260/465 D; 260/465.4; 560/24; 560/25; 560/32; 560/33; 560/115; 560/157; 560/158; 560/162; 560/163; 560/165; 526/301
[58] Field of Search ............... 260/465 D, 465.4, 464; 560/24, 25, 33, 157, 158, 165, 32, 115, 162, 163

[56] References Cited

U.S. PATENT DOCUMENTS

| | | | |
|---|---|---|---|
| 3,173,900 | 3/1965 | Hankins | 260/80.5 |
| 3,342,791 | 9/1967 | Kelley | 260/86.1 |
| 3,479,328 | 11/1969 | Nordstrom | 260/86.1 |
| 3,674,838 | 7/1972 | Nordstrom | 560/157 |
| 3,743,669 | 7/1973 | Hillman et al. | 260/465.6 |
| 4,126,747 | 11/1978 | Cowherd et al. | 520/166 |

Primary Examiner—Dolph H. Torrence
Attorney, Agent, or Firm—Wood, Herron & Evans

[57] ABSTRACT

Acrylic monomers containing a carbamate (urethane) functionality having the general formula:

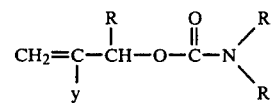

and difunctional carbamate monomers having the general formula:

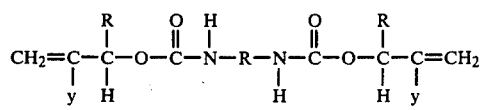

are prepared from 2-(1-hydroxyalkyl)-acrylates, acrylamides, acrylonitriles, vinyl ketones and nitroethylenes.

11 Claims, No Drawings

ACRYLIC MONOMERS CONTAINING CARBAMATE FUNCTIONALITY

BACKGROUND OF THE INVENTION

Acrylic or vinyl type monomers containing a carbamate functionality are useful in coatings which are mar-resistant and resistant to acids, bases and many other types of solvents. Nordstrom U.S. Pat. No. 3,479,328 describes the production of such a carbamate monomer which contains an ester functionality. The prior art fails to disclose a method of preparing acrylic carbamate monomers which contain other functionalities such as cyano, ketone, nitro or amide functionalities. This application describes various methods of producing such acrylic monomers. The addition of these functionalities can be used to affect certain characteristics of the monomer such as polarity, viscosity, or crosslinking ability, thus increasing its usefulness in certain applications. In addition, this application discloses difunctional carbamate monomers which contain the various functional groups listed above. Both these results were not possible through prior art methods.

SUMMARY OF THE INVENTION

The novel carbamate monomers of the present invention are illustrated by the following formula:

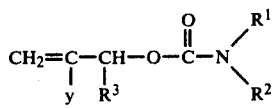

wherein,
y represents one of the following groups:

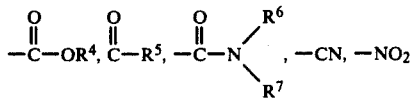

$R^4$–$R^7$ each represents branched or straightchain, substituted or unsubstituted alkyl, substituted or unsubstituted cycloalkyl, cycloalkyl-substituted alkyl, substituted or unsubstituted aryl, aralkyl, or alkaryl.

$R^1$ and $R^2$ represent H, alkyl, cycloalkyl, dicycloalkyl, aryl, aralkyl and alkaryl.

$R^3$ represents alkyl, alkaryl, aralkyl, substituted and unsubstituted aryl.

The following difunctional carbamate monomer is also obtained by a similar method.

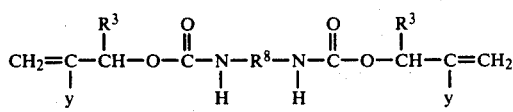

Wherein y and $R^3$ represent the same groups listed above; and $R^8$ represents alkyl, cycloalkyl, dicycloalkyl, aralkyl, alkaryl, or aryl. The substituents generally represented by R above or, hereinafter referred to, must be inert under reaction conditions and substantially non-reactive with the reaction components and catalyst.

Representatives specific monomers within the scope of the present invention include:
2-[1-(N-methyl carbamyl)ethyl] ethyl acrylate
2-[1-(N-ethyl carbamyl)ethyl] ethyl acrylate
2-[1-(N-butyl carbamyl)ethyl] ethyl acrylate
2-[1-(N-octyl cabamyl)ethyl] ethyl acrylate
2-[1-(N-phenyl carbamyl)ethyl] ethyl acrylate
2-[1-(N-cyclohexyl carbamyl)ethyl] ethyl acrylate
2-[1-(N-methyl carbamyl)ethyl] methyl acrylate
2-[1-(N-ethyl carbamyl)ethyl] methyl acrylate
2-[1-(N-butyl carbamyl)ethyl] methyl acrylate
2-[1-(N-octyl carbamyl)ethyl] methyl acrylate
2-[1-(N-cyclohexyl carbamyl)ethyl] cyclohexyl acrylate
2-[1-(N-cyclohexyl carbamyl)ethyl] methyl acrylate
2-[1-(N-phenyl carbamyl)ethyl] methyl acrylate
2-[1-(N-methyl carbamyl)ethyl] cyclohexyl acrylate
2-[1-(N-phenyl carbamyl)ethyl] cyclohexyl acrylate
2-[1-(N-methyl carbamyl)ethyl] phenyl acrylate
2-[1-(N-ethyl carbamyl)ethyl] phenyl acrylate
2-[1-(N-butyl carbamyl)ethyl] phenyl acrylate
2-[1-(N-octyl carbamyl)ethyl] phenyl acrylate
2-[1-(N-cyclohexyl carbamyl)ethyl] phenyl acrylate
2-[1-(N-phenyl carbamyl)ethyl] phenyl acrylate
2-[1-(N-methyl carbamyl)ethyl] p-methoxyphenyl acrylate
2-[1-(N-cyclohexyl carbamyl)ethyl] p-methoxyphenyl acrylate
2-[1-(N-phenyl carbamyl)ethyl] p-methoxyphenyl acrylate
2-[1-(N-methyl carbamyl)ethyl] m-chlorophenyl acrylate
2-[1-(N-cyclohexyl carbamyl)ethyl] m-chlorophenyl acrylate
2-[1-(N-phenyl carbamyl)ethyl] m-chlorophenyl acrylate
2-[1-(N-methyl carbamyl)ethyl] N,N-diethyl acrylamide
2-[1-(N-ethyl carbamyl)ethyl] N,N-diethyl acrylamide
2-[1-(N-butyl carbamyl)ethyl] N,N-diethyl acrylamide
2-[1-(N-octyl carbamyl)ethyl], N,N-diethyl acrylamide
2-[1-(N-cyclohexyl carbamyl)ethyl] N,N-diethyl acrylamide
2-[1-(N-phenyl carbamyl)ethyl] N,N-diethyl acrylamide
2-[1-(N-methyl carbamyl)ethyl] N,N-diphenyl acrylamide
2-[1-(N-cyclohexyl carbamyl)ethyl] N,N-diphenyl acrylamide
2-[1-(N-phenyl carbamyl)ethyl] N,N-diphenyl acrylamide
2-Cyano-3-(N-ethyl carbamyl)-1-butene
2-Cyano-3-(N-butyl carbamyl)-1-butene
2-Cyano-3-(N-octyl carbamyl)-1-butene
2-Cyano-3-(N-cyclohexyl carbamyl)-1-butene
2-Cyano-3-(N-phenyl carbamyl)-1-butene
2-[1-(N-methyl carbamyl)ethyl]-1-butene-3-one
2[1-(N-ethyl carbamyl)ethyl]-1-butene-3-one
2-[1-(N-butyl carbamyl)ethyl]-1-butene-3-one
2-[1-(N-octyl carbamyl)ethyl]-1-butene-3-one
2-[1-(N-cyclohexyl carbamyl)ethyl]-1-butene-3-one
2-[1-(N-phenyl carbamyl)ethyl]-1-butene-3-one
2-[1-(N-methyl carbamyl)ethyl] cyclohexyl vinyl ketone
2-[1-(N-cyclohexyl carbamyl)ethyl] cyclohexyl vinyl ketone
2-[1-(N-phenyl carbamyl)ethyl] cyclohexyl vinyl ketone 2-[1-(N-methyl carbamyl)ethyl] phenyl vinyl ketone
2-[1-(N-cyclohexyl carbamyl)ethyl] phenyl vinyl ketone
2-[1-(N-phenyl carbamyl)ethyl] phenyl vinyl ketone
2-[1-(N-methyl carbamyl)ethyl] benzyl vinyl ketone
2-[1-(N-cyclohexyl carbamyl)ethyl] benzyl vinyl ketone
2-[1-(N-phenyl carbamyl)ethyl] benzyl vinyl ketone
2-[1-(N-methyl carbamyl)ethyl] nitroethylene
2-[1-(N-cyclohexyl carbamyl)ethyl] nitroethylene
2-[1-(N-phenyl carbamyl)ethyl] nitroethylene The following are examples of difunctional monomers utilizing 2,4-toluene diisocyanate, methylenebis (4-phenyl isocyanate) and 4,4′-methylenebis (cyclohexyl isocyanate).

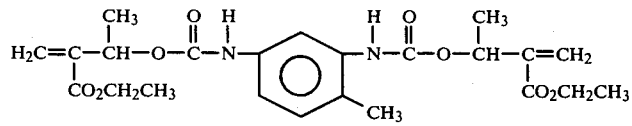

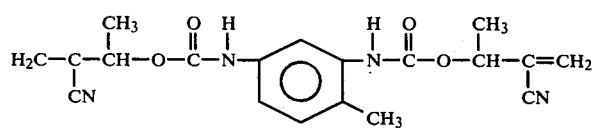

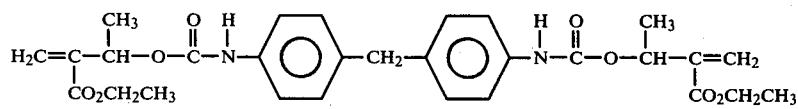

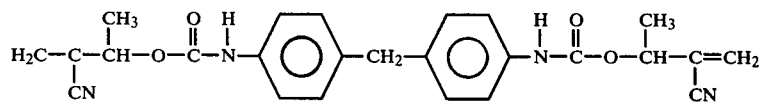

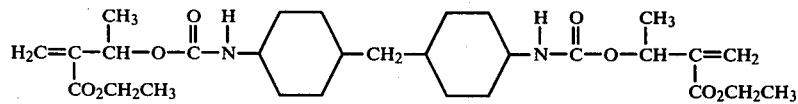

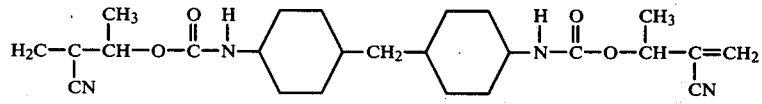

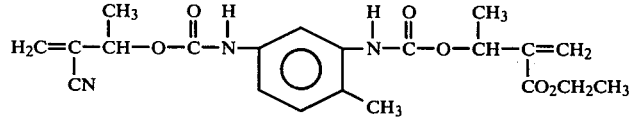

The new monomers of the present invention are prepared from 2-(1-hydroxyalkyl)-acrylates, acrylonitriles, acrylamides, vinyl ketones or nitroethylenes (hereinafter referred to as the acrylic alcohol). This compound is prepared by reacting an ester, nitrile, amide, ketone or nitro derivatives of an alpha-, beta olefinically unsaturated carboxylic acid with an aldehyde, in the presence of a catalyst. (See U.S. Pat. No. 3,743,669). By reacting an acrylic alcohol with an isocyanate, phosgene or urea, applicant has been able to produce acrylic carbamate monomers which contain any of the following funtional groups: ester, nitrile, amide, ketone and nitro. Thus, applicant has discovered a means to produce a wide variety of acrylic carbamate monomers, thereby increasing the utility of such monomers. By using applicant's invention, one can produce an acrylic carbamate monomer with selected characteristics such as increased viscosity, polarity, or cross-linking ability.

The following equations illustrate the various methods by which the novel monomers of the present invention are prepared:

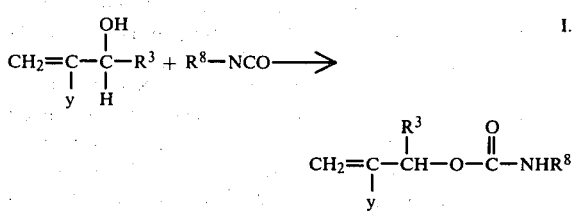

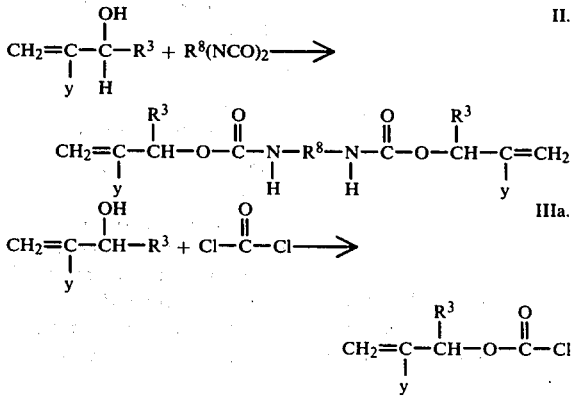

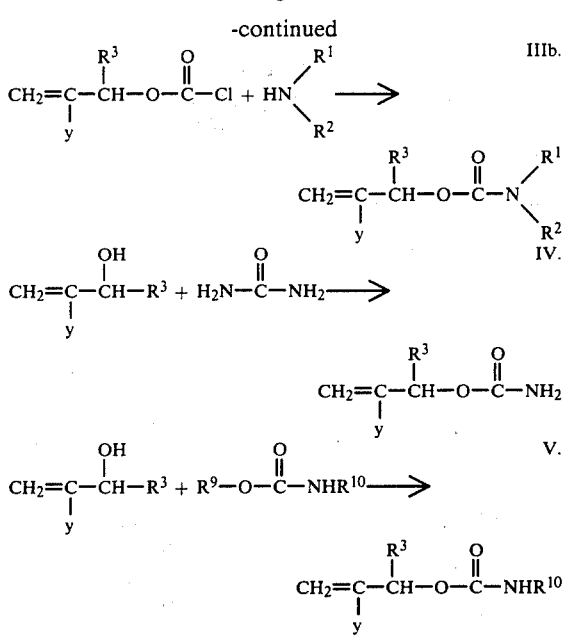

In these formulas Y and $R^1$-$R^8$ represent the groups listed above. $R^9$ and $R^{10}$ represent the same groups symbolized by $R^8$ and $R^1$ respectively.

DESCRIPTION OF THE INVENTION

Preparation of the Carbamate Monomer

Equations I through V illustrate various methods for preparing the novel monomers of the present invention. Equations I, III, IV, and V illustrate methods of preparation of monofunctional carbamate monomers; and equation II, a variation of equation I, illustrates a method of preparing a difunctional carbamate monomer.

Isocyanate Method

Equations I and II illustrate the preparation of carbamate monomers from an isocyanate (or diisocyanate as in equation II), which is the preferred method. The reactions described by equations I and II are conducted in a reaction vessel equipped with an overhead stirrer and water condenser. The reaction is conducted in an inert atmosphere such as helium or nitrogen which is preferred. If desired, the reaction can be conducted in an insert solvent such as ethyl acetate. The reaction vessel is charged with the acrylic alcohol and a urethane catalyst such as stannous octoate. To this stirred mixture, sufficient isocyanate or diisocyanate is slowly added so that there is a one to one molar ratio of alcohol to isocyanate functionality. The mixture should be maintained below 35° C. during the addition by cooling or adjustment of the addition rate of the isocyanate or diisocyanate. After the addition is complete, the mixture should be stirred until reaction is complete. A simple way to determine the completion of the reaction is by monitoring the isocyanate band in the infrared. When the band is extinct, the reaction is complete.

Chloroformate Method

Equations IIIa and b together illustrate the two step chloroformate method. In the phosgene reaction (IIIa), phosgene is reacted with the acrylic alcohol to form a chloroformate. An excess of phosgene is preferably employed to prevent carbonate formation. The reaction can be carried out in phosgene alone or in an inert solvent such as ethyl acetate, at temperatures between −20° C. and +40° C. and preferably between 0° C. and +30° C. in order to prevent decomposition of the resulting chloroformate.

The acrylic alcohol is slowly added to twenty to sixty percent excess phosgene. More phosgene can be used without adversely affecting the reaction but is undesirable for economic reasons. After completion of the formation of the crude chloroformate, the excess phosgene and solvent, if any, is removed by distillation.

The crude chloroformate resulting from the reaction can be reacted without additional purification, as illustrated in equation IIIb. In equation IIIb an excess of amine (either ammonia, primary amine or secondary amine, depending on the intended product) is placed in a reaction vessel which is provided with external cooling means. The chloroformate produced as described above is then slowly added either alone or in an inert solvent, to the excess amine while the temperature is maintained between approximately −20° C. and +40° C. and preferably between 0° C. and +25° C. in order to retard the evaporation of the amine while permitting the reaction to occur at an economical rate.

The amount of excess amine used is 1.5 to 2.2 and preferably 2.0 to 2.2 moles of amine per mole of chloroformate. More than 2.2 moles can be used, but the yield of unsaturated carbamate is reduced because of the reaction of amine with the unsaturation in the chloroformate.

The above-described chloroformate method is simple in operation and results in high yields and also represents a preferred method.

In a less preferred embodiment, the chloroformate method may be practiced in a single-step by mixing the acrylic alcohol, the phosgene, and the amine. Since the phosgene reacts more readily with the amine to form urea and the urea reacts more sluggishly with the acrylic alcohol, an overall reduction in the rate of reaction results.

Urea Method

The novel monomers of the present invention can also be prepared by the urea method illustrated by equation IV. The acrylic alcohol and urea are mixed in substantially stoichiometric amounts and heated to about 120° C. to 140° C. to yield the carbamate monomer. At temperatures below 130° C. the reaction proceeds at an uneconomically slow rate. At temperatures above 130° C. polymerization of the acrylic alcohol occurs reducing the yield of the carbamate monomer. For these reasons the urea method is not preferred.

Transesterification

The novel monomers of the present invention can also be prepared by the transesterification reaction illustrated by equation V. In this reaction, an alkyl, aromatic, or alkyl aromatic carbamate compound is combined with substantially stoichiometric amounts of the acrylic alcohol under conditions well known in the art of transesterification. The carbamate monomers employed in this reaction are commercially available or can be prepared by one of several well-known methods such as the reaction of an alcohol with urea.

Polymerization of the Carbamate Monomer

The novel monomers of the present invention can be polymerized either alone or in combination with other vinyl monomers by bulk, solution, suspension, or emulsion methods according to procedures well known in the art of polymerization of vinyl monomers. The carbamate group does not interfere with these procedures. The monomers of this present invention are also co-polymerizable with other vinyl monomers such as acrylic monomers including acrylic acid, methacrylic acid, methylmethacrylate, ethylacrylate, isobutylacrylate, and acrylonitrile; vinyl esters such as vinyl acetate, vinyl propianate; vinyl aromatic monomers such as styrene, chlorostyrene; vinyl halide monomers such as vinyl chloride, vinylidine chloride; olefinic monomers such as isobutylene, butadiene, neoprene; and vinyl ethers such as methyl vinyl ether.

In general, polymerization of the novel monomers of the present invention can be carried out by heating the monomers alone or with other vinyl monomers to a temperature of 50° C. to 150° C. and preferably 80° C. to 120° C. until polymerization is complete, as determined by analysis for unreactive monomer. The polymerization should be conducted in the presence of 0.01% to 5% and preferably 0.5% to 3% of a suitable free radical polymerization catalyst such as benzoyl peroxide, cumine hydroperoxide, di-tertiary butyl peroxide, methylethyl ketone peroxide, tert-butyl perbenzoate, cyclohexanone peroxide, $\alpha,\alpha'$-azodiisobutyronitrile, and mixtures of the above. A preferred catalyst is a mixture of two parts by weight of cumine hydroperoxide to one part by weight of di-tertiary butyl peroxide. Accelerators such as ethanolamine can also be added in amounts from 0.001% to 2% as well as polymerization inhibitors such as hydroquinone in amounts up to 1%.

The above reaction can be carried out in the presence of a suitable inert solvent which refluxes within the desired temperature range such as xylene, toluene, or benzene. Alternatively, a liquid vinyl monomer such as styrene can be employed as solvent. In order to prevent oxidation of the double bonds, the reaction is preferably carried out in an inert atmosphere such as helium or nitrogen which is preferred.

Those monofunctional monomers of the present invention which have at least one free hydrogen attached to the nitrogen of the carbamate functionality (i.e., those in which $R^1$ or $R^2$ L represent hydrogen) can be alkyolated by reacting the monomer with an aldehyde, such as formaldehyde which is preferred, acetaldehyde, propionaldehyde, butyraldehyde, furfural, benzaldehyde, acrolein, methacrolein, and glyoxal. In aqueous solution, the pH is maintained at 8.0 or above; in alcoholic solution, both acidic and alkaline conditions can be employed.

When the reaction is carried out in an aqueous medium, the mixture of the polymer and the aldehyde is heated at temperatures between 10° C. and 100° C. and preferably between 35° C. and 80° C. until at least one aldehyde group has reacted with each carbamate group. This is readily determined by the extinction of absorption bands characteristic of primary or secondary amines (depending on the monomer used) in infrared spectra. From about 0.5 to 4.0 and preferably from 1.0 L to 2.5 moles of aldehyde are used per carbamate equivalent. The monomers of the present invention modified by aldehydes as described above may be employed in this form or may be reacted with an alcohol to etherify the alkylol groups. The monomers in the etherified condition are less reactive and, therefore, more stable than the polymers in the alkylol form.

The etherified monomer can be produced by reacting the aldehyde-modified monomer with an alcohol under acidic conditions or by reacting the unmodified monomer with an aldehyde in an acidic alcoholic solution.

When the etherification is carried out with the unmodified monomer in an acidic, aldehyde alcoholic medium, the reaction mixture is heated at reflux, generally from 10° C. to 170° C. and preferably from 50° C. to 130° C. The reaction of formaldehyde with the carbamate results in methylol groups which react with the alcohol to form ether groups and by-product water which is removed by azeotropic distillation. While any alcohol may be used, the lower aliphatic alcohols of 1 to 7 carbon atoms having one hydroxyl group are preferred. Examples include, among others, methanol, ethanol, propanol, isopropanol, butanol, isobutanol, pentanol, and cyclohexanol.

The alcohol should be present in an excess which provides at least 2 and preferably 3 moles of alcohol per mole of aldehyde so that reaction of methylol groups with other carbamate methylol groups is substantially eliminated. From about 0.5 to 4.0 moles and preferably from 2.5 to 4.0 moles of alcohol per carbamate equivalent is used. Enough of an acid catalyst is added to lower the initial pH of the solution to between about 2.5 to 6.0. Suitable acid catalysts include inorganic acids such as aqueous sulfuric acid and phosphoric acid, and organic acids such as formic acid, acetic acid, lactic acid, oxalic acid, alkyl and aryl sulfuric acids, the phthalic acids, as well as anhydrides and salts of weak bases of the above acids.

The temperture of the reaction is conveniently controlled by the use of the solvent or solvent mixture which refluxes within the above-described temperature range. Substantially the same conditions and reactants are employed to etherify the aldehyde-modified polymer except that no aldehyde is added to the reaction mixture.

The aldehyde-modified monomers are more reactive and, therefore, less stable than the etherified polymers. However, in subsequent curing by cross-linking, the aldehyde-modified monomer acts in a similar manner to the etherified monomer since at the temperatures required for curing, the etherified group is reactive. Cross-linking of the aldehyde-modified monomer can be effected by simply heating the monomer to any temperature above 100° C. and preferably above 135° C. and below the degradation temperature which is easily determined for any given monomer and, generally, is about 250° C. Alternatively, the monomer can be cross-linked by mixing it with any known cross-linking agent which is suitable for cross-linking prior art alkylol-containing monomers. Examples of such cross-linking agents are methylol phenol and melamine formaldehyde resins. Alternatively, these monomers can be cross-linked by mixing them with 0.05% to 5% and preferably 0.5% to 2.5% of an acid such as p-toluene sulfonic acid.

The novel monomers of the present invention find utility as precursors for the production of other useful chemicals, as cross-linking agents for other resins, as precursors for the production of novel and useful polymers, as well as additives to increase the toughness, mar-resistance, adhesion, chemical- and solvent-resistance of other addition polymers. The novel polymers of the present invention are useful as coating materials for all types of substrates such as wood, glass, ceramic, tile, and the like. Such coatings when cured have excellent adhesion, mar-resistance, as well as resistance to acids, bases, and many types of solvents.

The invention is further illustrated by the following nonlimiting examples which include a preferred embodiment and in which all parts and percentages are by weight unless otherwise indicated.

EXAMPLE I

This example illustrates the preparation of 2-[1-(N-methylcarbamyl)ethyl] acrylate by the isocyanate method which is described in equation I. 85.8 parts 2-(1-hydroxyethyl) ethyl acrylate and 0.30 parts stannous octoate were placed in a three-necked 250 m. round bottom flask equipped with an overhead stirrer, water condenser, dropping funnel and $N_2$ inlet to provide an inert atmosphere.

To this stirred mixture 34.2 parts methyl isocyanate was slowly added through the dropping funnel. The temperature of the mixture was kept below 35° C. during addition by cooling and adjusting the addition rate of the isocyanate. After the addition was complete, the mixture was stirred for an additional six hours. The mixture was then subjected to reduced pressure to remove any unreacted methyl isocyanate. The product thus obtained is an oil which upon standing slowly solidifies to a waxy solid. (M.P. 37° C. to 39° C.).

EXAMPLE II

2-Cyano-3-(N-methyl carbamyl)-1-butene was prepared through the following reaction. A three-necked 250 ml round bottom flask equipped with an overhead stirrer, $N_2$ inlet, water condenser and dropping funnel was charged with 47.5 parts 2-(1-hydroxyethyl) acrylonitrile and 0.71 parts stannous octoate. To this stirred mixture, 28.5 parts methyl isocyanate was added through the dropping funnel. The mixture was maintained below 35° C. during addition by cooling and adjustment of the addition rate of the isocyanate. After the addition was complete, the mixture was stirred for an additional six hours. The product was then subjected to reduced pressure to remove any unreacted methyl isocyanate. The product was obtained as a viscous oil.

The following two examples demonstrate the utility of the present invention.

EXAMPLE III

A high solids coating in n-butyl acetate containing 2-[1-(N-methyl carbamyl)ethyl] ethyl acrylate was prepared according to the following. A three-necked round bottom flask equipped with an overhead stirrer, $N_2$ inlet, condenser, thermometer and dropping funnel was charged with 25 parts n-butyl acetate and slowly heated to 90° C. A monomer premix containing:

| | | |
|---|---|---|
| Styrene | 52 | parts |
| n-butyl acrylate | 51.2 | parts |
| 2-[1-(N-methyl carbamyl)ethyl] ethyl acrylate | 20.1 | parts |
| 2,2'-azodiisobutyronitrile | 3.7 | parts | was placed in the dropping funnel and slowly added to the heated solvent over a period of 1½ hours. The mixture was maintained at 90°-100° C. during the addition and for 1 hour after addition of the premix was complete. At this time, a solution of 1.7 part 2,2'-azodiisobutyronitrile in 3 part n-butyl acetate was added and the mixture was heated an additional 1 hour at 90°-100° C. The final product was obtained as a clear liquid with a viscosity of 11 stokes. The molecular weight of the polymer was 13,200 as estimated by GPC.

A portion of this solution was combined with 20 phr Cymel 303, a brand of hexamethoxymethylmelamine sold by American Cyanamid, and 1% (W/W) catalyst 1010, a fairly strong acid catalyst also sold by American Cyanamid. The resultant solution was cast onto glass, aluminum and clean cold roll steel panels as 3 mil wet films. The clear coatings were cured at 350° F. for 30 minutes in a forced air oven. The evaluation of these panels is contained in Table 1.

TABLE I

| Substrate | ALUMINUM | COLD ROLL STEEL | GLASS |
|---|---|---|---|
| Sward Hardness | | | 36 |
| T-Bend | +6T | | |
| 100 Rub MEK Test | 50 | 100 | 80 |
| Impact: Front | 0 | 10 | |
| Reverse | 0 | 0 | |
| Adhesion | 100% | 100% | 100% |

EXAMPLE IV

A latex coating was prepared containing ethyl 2-(N-methyl carbamyl)-2-methenyl butanoate according to the following procedure. 9 Part Allipal EP-110 (GAF), 0.6 part sodium bicarbonate and 306 part deionized water were charged to a 1-liter, 3-necked flask equipped with a stirrer, thermometer, $N_2$ inlet, and reflux condenser. The mixture was heated with stirring under a slow stream of nitrogen to 81.5° C. To that mixture was added 60 ml (about 20%) of a monomer premix containing:

| | |
|---|---|
| Methyl methacrylate | 67.5 part |
| Butyl acrylate | 129.6 part |
| Styrene | 54.0 part |
| Ethyl 2-(N-methyl carbamyl)-2-Methyl butanoate | 13.5 part |
| methacrylic acid | 5.4 part |
| t-dodecyl mercaptan | 0.5 part |

After 2 minutes, a solution consisting of 10 ml deionized water and 0.81 part ammonium persulfate was added. Stirring was continued; and after 10 minutes, the addition of the remaining monomer premix was started at a rate sufficient to complete the addition in 2.5 hours. During the addition, stirring under nitrogen was continued and the temperature of the reaction mixture was maintained at 81°-85° C. Following the addition of the monomer premix, a solution of ammonium persulfate (0.16 part) in 20 ml of deionized water was added. The polymerization was continued for an additional hour and then the latex was cooled to room temperature, filtered, and the pH adjusted to 7.5 with a 50% solution of dimethylethanolamine in water.

| MILL BASE | |
|---|---|
| | Parts (wt.) |
| Propylene Glycol | 32.23 |
| Resimene 745 | 32.20 |
| Dimethylethanol amine | 4.80 |
| Rutile TiO$_2$ (DuPont R-902) | 225.58 |
| Water | 59.56 |
| | Pebble Mill Above to 7½ Hegman |

-continued

| Let Down with: | |
|---|---|
| Latex | 652.49 |
| Texanol | 32.23 |
| Pigment to Binder | 0.7 |
| LATEX EVALUATION | |
| Enamel drawn down on Bonderite 1000 × 24 ga. baked 15 min. at 325° F. | |
| Gloss, 60°/20° | 90/80 |
| Pencil Hardness | B |
| Film Thickness | 1.2–1.6 mil |
| Reverse Impact | 140 in. lbs. |
| MEK Rubs | Pass 100 |
| LATEX PROPERTIES | |
| Total Solids | 43.3% |
| Viscosity (pH 7.5) | 410 cps (Brookfield) |
| Chemical Stability | (ml of salt solution added to 20 ml latex with stirring to cause coagulation) |
| | 5% CaCl₂ 3.7 ml |
| | 5% Alum 3.3 ml |
| Minimum Film Forming Temperature | 15° C. |

What is claimed is:

1. A compound having the formula:

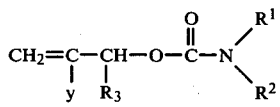

whereiN $R^1$ and $R^2$ are selected from the group consisting of hydrogen, alkyl, cycloalkyl, dicycloalkyl, aryl, aralkyl, and alkaryl; and
wherein $R^3$ is selected from the group consisting of: alkyl, alkaryl, aralkyl and aryl; and
wherein y is selected from the group consisting of:

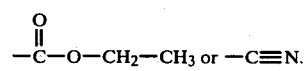

wherein $R^4$, $R^5$, $R^6$ and $R^7$ are selected from the group consisting of: alkyl, cycloalkyl, aryl, aralkyl, alkaryl, halogen substituted aryl and alkoxyaryl.

2. The compound of claim 1 wherein $R^3$ is —CH₃.
3. The compound of claim 2 wherein $R^2$ is —H.
4. The compound of claim 3 wherein $R^1$ is —CH₃, —CH₂—CH₃, —CH₂—CH₂—CH₃, —CH₂—CH₂—CH₃, cyclohexyl or aryl.
5. The compound of claim 4 wherein y is:

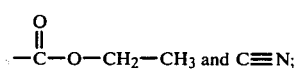

6. A compound having the formula:

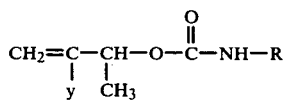

wherein y is selected from the group consisting:

$$-\overset{O}{\overset{\|}{C}}-O-CH_2-CH_3 \text{ and } C\equiv N;$$

and wherein R is —CH₃, —CH₂—CH₃, —CH₂—CH₂—CH₃, —CH₂—CH₂—CH₂—CH₃, cyclohexyl or aryl.

7. A compound having the formula:

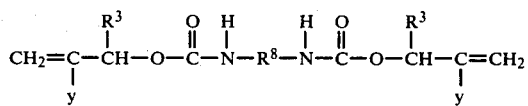

wherein $R^3$ is selected from the group consisting of: alkyl, alkaryl, aralkyl and aryl; and
wherein $R^8$ is selected from the group consisting of: alkyl, cycloalkyl, dicycloalkyl, aryl, aralkyl or alkaryl.
wherein y is selected from the group consisting of:

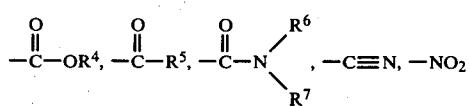

and $R^4$, $R^5$, $R^6$ and $R^7$ are selected from the group consisting of: alkyl, cycloalkyl, aryl, aralkyl, alkaryl, halogen substituted aryl and alkyoxyaryl.

8. A compound as in claim 7 wherein $R^8$ is selected from one of the following:

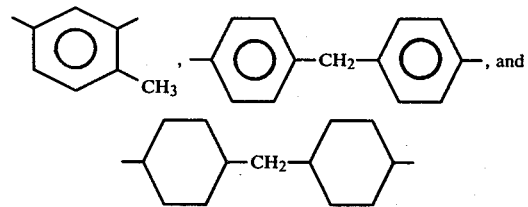

9. A compound as in claim 8 wherein y is:

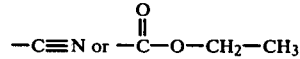

10. A compound according to 9 wherein $R^3$ is —CH₃.
11. A compound having the formula:

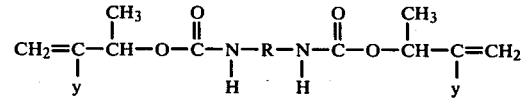

wherein y is:

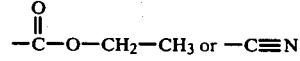

and R is selected from one of the following:

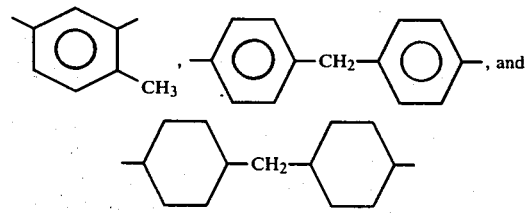

* * * * *

UNITED STATES PATENT AND TRADEMARK OFFICE
CERTIFICATE OF CORRECTION

PATENT NO. : 4,279,833
DATED : July 21, 1981
INVENTOR(S) : Billy M. Culbertson et al It is certified that error appears in the above—identified patent and that said Letters Patent is hereby corrected as shown below:

In column 2, line 58, a "-" should be added after --2--.

In column 3, lines 55-56, the material in parentheses should be underscored.

In column 7, line 49, delete "L".

In column 7, line 64, delete "L".

In column 9, line 11, delete "N-".

In column 11, line 30, "whereiN" should read --wherein--

In column 11, line 50-51, the last formula should read ---$CH_2$-$CH_2$-$CH_2$-$CH_3$" instead of "-$CH_2$-$CH_2$-$CH_3$".

Signed and Sealed this

Twenty-sixth Day of January 1982

[SEAL]

Attest:

GERALD J. MOSSINGHOFF

*Attesting Officer*  *Commissioner of Patents and Trademarks*